United States Patent
Koide et al.

(10) Patent No.: US 8,573,619 B2
(45) Date of Patent: Nov. 5, 2013

(54) SUSPENSION ASSEMBLING STRUCTURE, SPRING SEAT, AND SUSPENSION ASSEMBLING METHOD

(75) Inventors: Reo Koide, Kawasaki (JP); Keiichi Nakajima, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/412,903

(22) Filed: Mar. 6, 2012

(65) Prior Publication Data

US 2012/0292876 A1  Nov. 22, 2012

(30) Foreign Application Priority Data

May 16, 2011  (JP) .................................. 2011-109665

(51) Int. Cl.
*B60G 11/14* (2006.01)

(52) U.S. Cl.
USPC ...... 280/124.141; 280/124.168; 280/124.179; 267/179; 267/248

(58) Field of Classification Search
USPC ..................... 280/124.155, 124.168, 124.179, 280/124.141, 124.145, 124.154; 267/178, 267/202, 209, 216, 286
See application file for complete search history.

(56) References Cited

U.S. PATENT DOCUMENTS

| 5,172,999 A * | 12/1992 | Ijima et al. ....................... 403/51 |
| 5,246,215 A * | 9/1993 | Takamura et al. ............. 267/170 |
| 6,076,841 A * | 6/2000 | Satou et al. ............. 280/124.179 |
| 6,726,191 B2 * | 4/2004 | Miyagawa et al. ........... 267/170 |
| 7,090,058 B2 * | 8/2006 | Miyazaki et al. ........ 188/322.12 |
| 7,374,157 B2 * | 5/2008 | Wakamori et al. ............ 267/179 |
| 7,387,307 B2 * | 6/2008 | Tanaka et al. .......... 280/124.135 |
| 7,959,171 B2 * | 6/2011 | Takahashi et al. ...... 280/124.151 |
| 2010/0320660 A1 * | 12/2010 | Takeda et al. ................. 267/168 |

FOREIGN PATENT DOCUMENTS

| JP | 11-310021 A | 11/1999 |
| JP | 2005-155808 A | 6/2005 |
| JP | 2005-201307 A | 7/2005 |
| JP | 2009-149280 A | 7/2009 |

OTHER PUBLICATIONS

U.S. Appl. No. 13/412,935, filed Mar. 6, 2012, Koide et al.
U.S. Appl. No. 13/413,094, filed Mar. 6, 2012, Koide et al.
U.S. Appl. No. 13/413,070, filed Mar. 6, 2012, Koide et al.

* cited by examiner

*Primary Examiner* — Faye M Fleming
*Assistant Examiner* — James English
(74) *Attorney, Agent, or Firm* — Foley & Lardner LLP

(57) ABSTRACT

In a suspension assembling structure, a suspension link has an engagement hole formed in a mounting face for a spring seat. The spring seat has a protrusion formed on the lower face of a seat body and configured to be brought into engagement with the suspension link by insertion into the engagement hole. Also, the spring seat has a flange formed on the outer peripheral surface of a cylindrical portion in a manner so as to radially protrude through a clearance space defined between adjacent wires of a coil spring, and configured to hold the wire of a first turn at the lower end of the coil spring, while being kept in abutted-engagement with the upper face of the first turn.

9 Claims, 9 Drawing Sheets

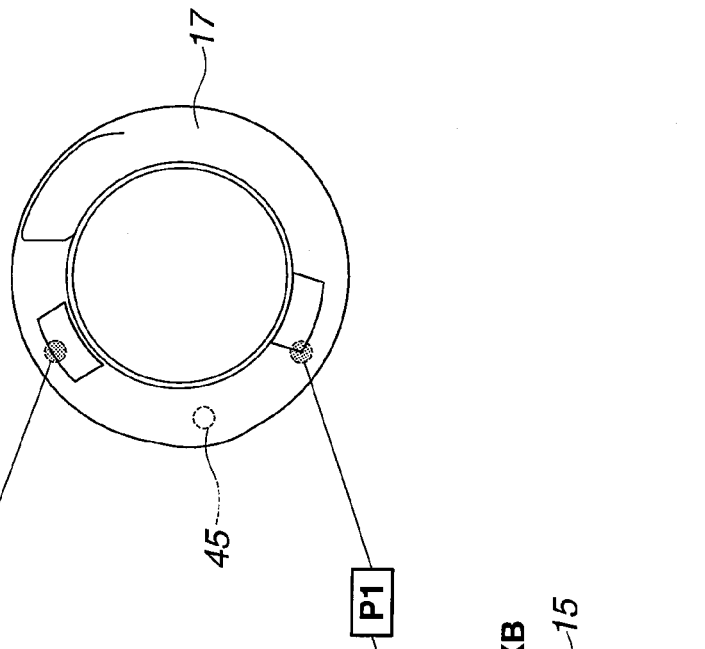
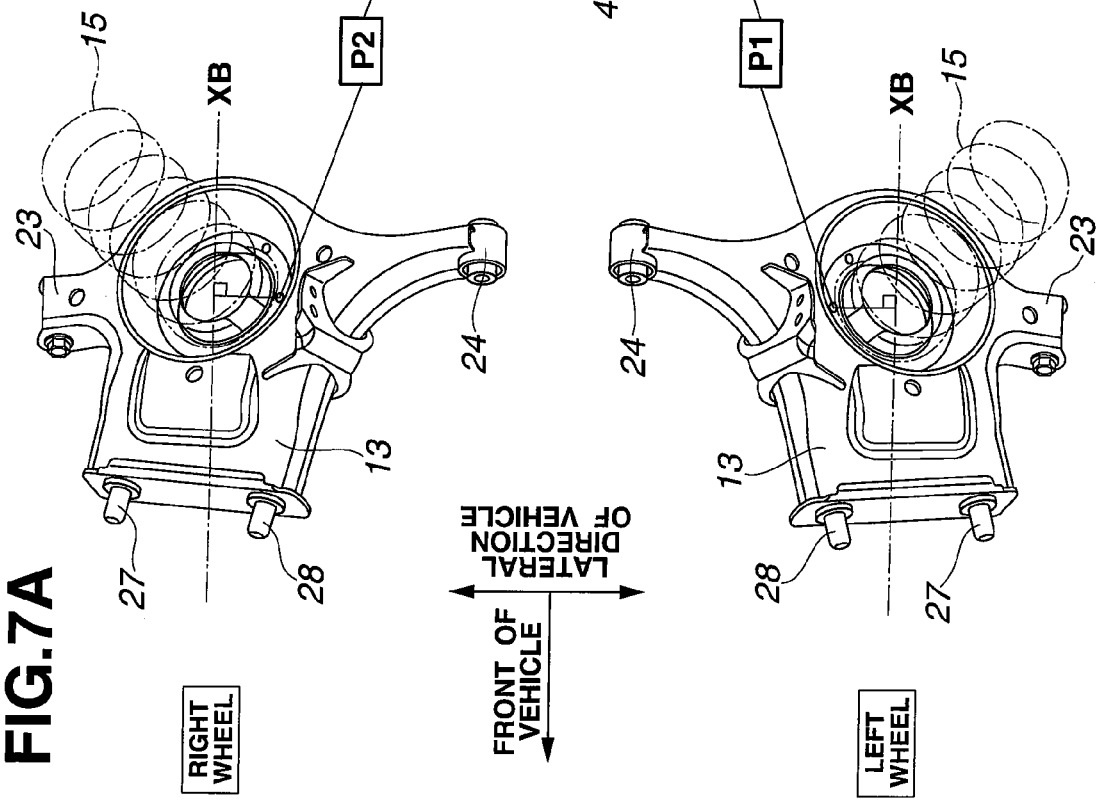

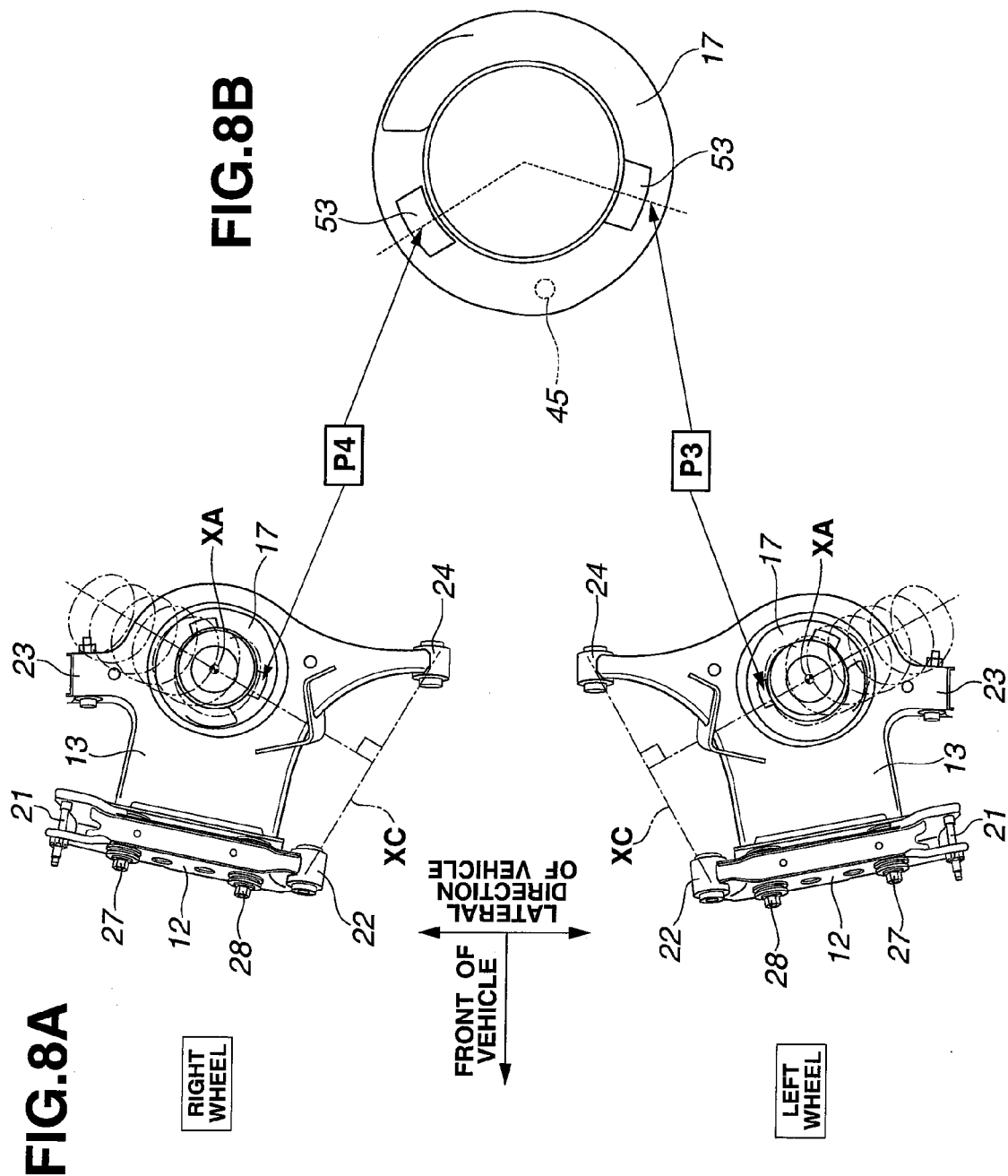

SUSPENSION ASSEMBLING STRUCTURE, SPRING SEAT, AND SUSPENSION ASSEMBLING METHOD

TECHNICAL FIELD

The present invention relates to a suspension assembling structure, a spring seat, and a suspension assembling method.

BACKGROUND ART

In recent years, there have been proposed and developed various multi-link suspensions in which a spring seat, formed of an elastic member, is provided on the upside of a lower link, and the lower end of a coil spring abuts on a recess formed in the upper face of the spring seat. One such spring seat has been disclosed in Japanese Patent Provisional Publication No. 2009-149280 (hereinafter is referred to as "JP2009-149280"). However, JP2009-149280 teaches the suspension structure in which the coil spring is merely in abutted-engagement with the spring seat. Thus, the suspension structure disclosed in JP2009-149280 has the difficulty of holding the spring seat during assembling. It would be desirable to provide a more improved suspension assembling structure by which a coil spring can be easily held when assembling a vehicular suspension system.

SUMMARY OF THE INVENTION

It is, therefore, in view of the previously-described disadvantages of the prior art, an object of the invention to provide a suspension assembling structure, a spring seat, and a suspension assembling method, by which a coil spring can be easily held when assembling a suspension system, thereby enhancing the ease of assembly of the coil spring.

In order to accomplish the aforementioned and other objects of the present invention, a suspension assembling structure comprises a suspension link through which a road wheel and a vehicle body are pivotably connected to each other, a coil spring interleaved between the suspension link and the vehicle body in such a manner that a spring axis of the coil spring is arranged in a substantially vertical direction of the vehicle body, a spring seat interleaved between the suspension link and a lower end of the coil spring, the suspension link having an engagement hole formed in a mounting face for the spring seat, the spring seat comprising a seat body, a protrusion formed on a lower face of the seat body and configured to be brought into engagement with the suspension link by insertion into the engagement hole, a cylindrical portion located on an upper face of the seat body and configured to be fitted into the lower end of the coil spring, and at least one flange formed on an outer peripheral surface of the cylindrical portion in a manner so as to radially protrude through a clearance space defined between adjacent wires of the coil spring, and configured to hold the wire of a first turn at the lower end of the coil spring, while being kept in abutted-engagement with an upper face of the first turn.

The other objects and features of this invention will become understood from the following description with reference to the accompanying drawings.

BRIEF DESCRIPTION OF THE DRAWINGS

FIG. 5A is a view showing the detailed structure of the lower rear link, hanging down from the suspension member, while

FIGS. 7A-7B are views explaining the ideal layout of protrusions formed on the respective spring seats of rear suspensions for rear-left and rear-right road wheels and the actual layout of the protrusion, common to the respective spring seats of rear-left and rear-right suspensions.

FIGS. 8A-8B are views explaining the ideal layout of flanges formed on the respective spring seats of rear suspensions for rear-left and rear-right road wheels and the actual layout of the flanges, common to the respective spring seats of rear-left and rear-right suspensions.

DESCRIPTION OF THE PREFERRED EMBODIMENTS

Hereinafter explained in reference to the drawings is the construction of the rear suspension of an automotive vehicle to which the suspension assembling structure of the embodiment can be applied.

[First Embodiment]

[Construction]

Figure 1:
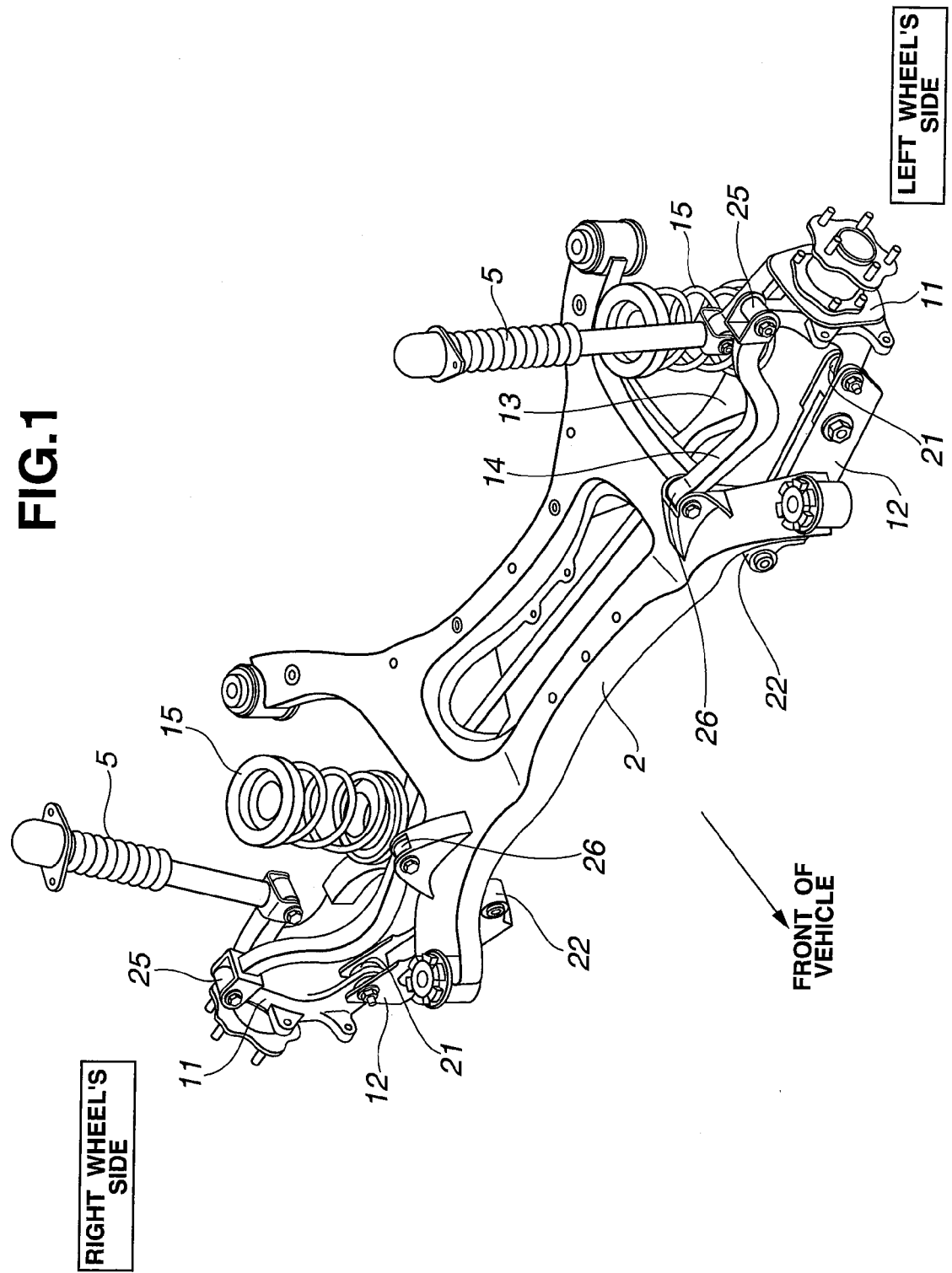
FIG. 1 is a perspective view illustrating the construction of an embodiment of a multi-link rear suspension.
Figure 2:
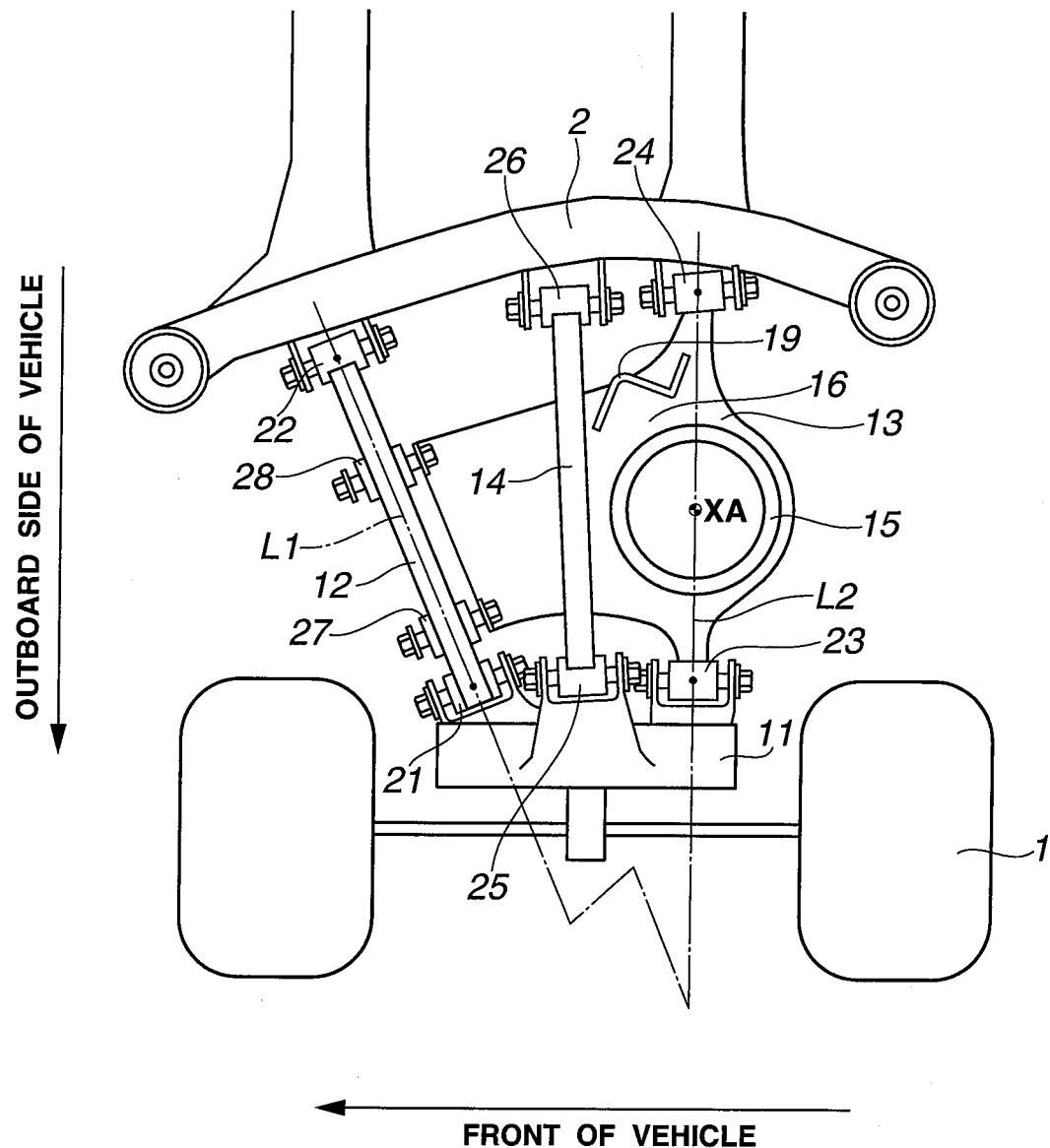
FIG. 2 is a top view illustrating the construction of the rear-left suspension of the embodiment.
Figure 3:
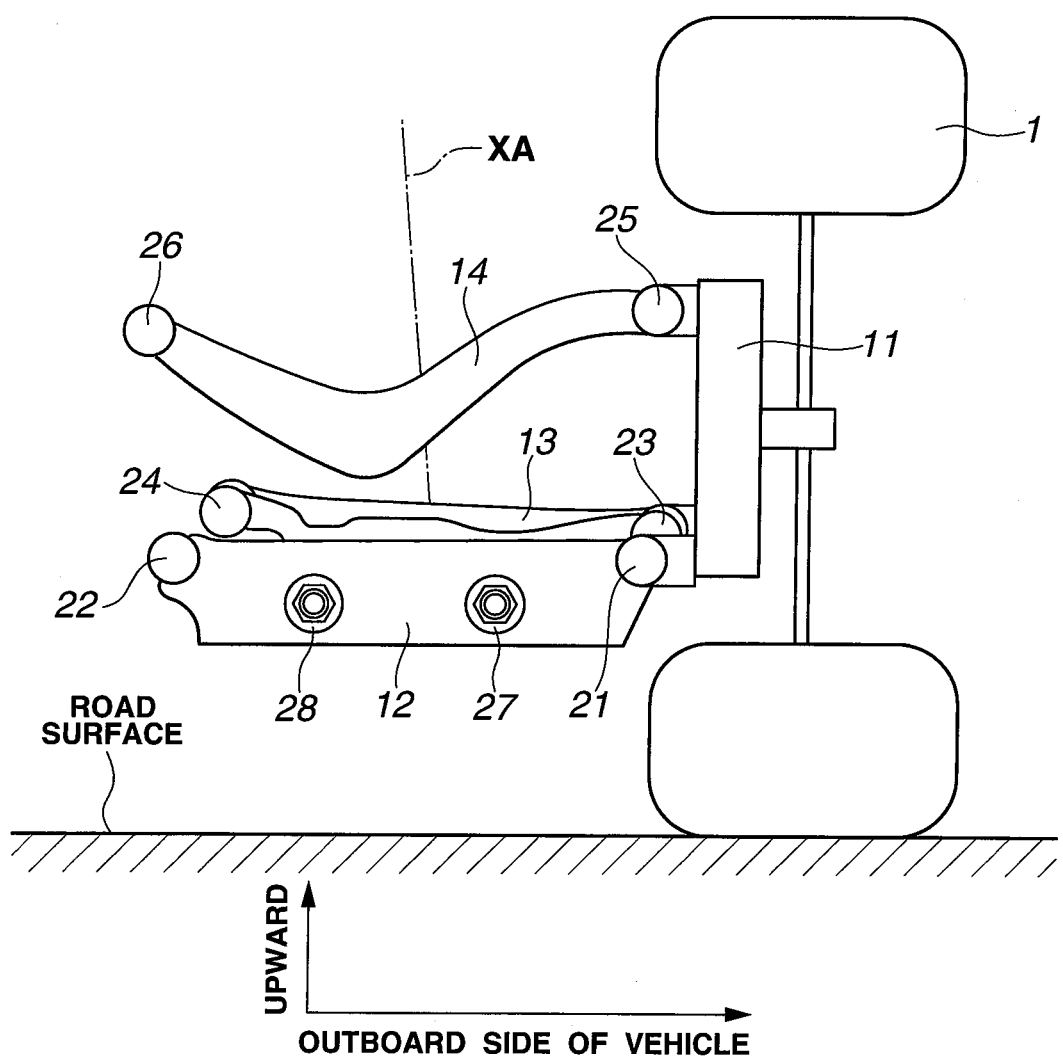
FIG. 3 is a front elevation view illustrating the construction of the rear-left suspension of the embodiment.

FIG. 1 is the perspective view illustrating the construction of the multi-link rear suspension of the embodiment under an assembled state. FIG. 2 is the top view illustrating the construction of the rear-left suspension of the embodiment under the assembled state. FIG. 3 is the front elevation view illustrating the construction of the rear-left suspension of the embodiment under the assembled state.

The suspension assembling structure of the embodiment is exemplified in an independently-suspended rear-left road-wheel suspension, simply, an independent rear-left suspension.

As shown in FIG. 1, the suspension structure is provided for suspending a road wheel 1 from a suspension member 2 of the vehicle-body side, and comprised of an axle housing 11 (a hub carrier), a lower front link 12, a lower rear link 13, an upper link 14, a coil spring 15, and a strut 5.

Axle housing 11 is configured to rotatably support the road wheel 1.

Under the assembled state, lower front link 12 and lower rear link 13 are located to be almost level with each other, and juxtaposed to each other substantially in the longitudinal direction of the vehicle body.

Lower front link 12 is configured to be pivotably connected at one end of the outboard side of the vehicle to the lower front part of axle housing 11 through a bush 21, and also configured to be pivotably connected at the other end of the inboard side of the vehicle to the lower front part of suspension member 2 through a bush 22. In the plan view (see FIG. 2), regarding the positions of these connection points in the longitudinal direction of the vehicle body, the connection point (i.e., bush 21) of the outboard side of the vehicle is positioned somewhat rearward with respect to the connection point (i.e., bush 22) of the inboard side of the vehicle.

Lower rear link 13 is configured to be pivotably connected at one end of the outboard side of the vehicle to the lower rear part of axle housing 11 through a bush 23, and also configured to be pivotably connected at the other end of the inboard side of the vehicle to the lower rear part of suspension member 2 through a bush 24. In the plan view (see FIG. 2), regarding the positions of these connection points in the longitudinal direction of the vehicle body, the connection point (i.e., bush 23) of the outboard side of the vehicle and the connection point (i.e., bush 24) of the inboard side of the vehicle are positioned to be almost the same longitudinal position.

The distance between the connection point (i.e., bush 21) of lower front link 12 to axle housing 11 and the connection point (i.e., bush 23) of lower rear link 13 to axle housing 11 is dimensioned to be shorter than the distance between the connection point (i.e., bush 22) of lower front link 12 to suspension member 2 and the connection point (i.e., bush 24) of lower rear link 13 to suspension member 2. That is, a straight line L1 (i.e., the axis of lower front link 12) passing through the connection points corresponding to bushes 21-22 and a straight line L2 (i.e., the axis of lower rear link 13) passing through the connection points corresponding to bushes 23-24 intersect with each other on the outboard side of the vehicle.

Upper link 14 is configured to be pivotably connected at one end of the outboard side of the vehicle to the upper part of axle housing 11 through a bush 25, and also configured to be pivotably connected at the other end of the inboard side of the vehicle to the upper part of suspension member 2 through a bush 26.

Each of bushes 21-26 is comprised of outer and inner cylinders (outer and inner tubes) nested each other, and an elastic body formed of a rubber medium and interleaved between the inner and outer cylinders. In the shown embodiment, both ends of each of lower front link 12, lower rear link 13, and upper link 14 are connected to the outer cylinders of the associated bushes. The inner cylinders of bushes 21, 23, and 25 are connected to axle housing 11, whereas the inner cylinders of bushes 22, 24, and 26 are connected to suspension member 2.

Lower rear link 13 is formed integral with an overhanging portion 16, extending toward the lower front link 12. The front end of overhanging portion 16 extending in the longitudinal direction of the vehicle body is connected to the lower front link 12 via bushes 27 and 28 in a manner so as to permit a displacement of the overhanging portion relative to the lower front link.

Bushes 27 and 28 are arranged along the lower front link 12. Each of bushes 27-28 is comprised of outer and inner cylinders nested each other, and an elastic body formed of a rubber medium and interleaved between the inner and outer cylinders. In the shown embodiment, the bush axis of each of bushes 27-28 is directed substantially in the longitudinal direction of the vehicle. The outer cylinder of each of bushes 27-28 is connected to the lower front link 12, whereas the inner cylinder of each of bushes 27-28 is connected to the front end of overhanging portion 16.

A displacement of overhanging portion 16 and lower rear link 13 relative to the lower front link 12 can be permitted within a movable range (a deflectable range), determined based on a deflection (a flexibility) of each of bushes 27-28. By the way, in the shown embodiment, each of bushes 27-28 has a stiffness anisotropy that a lateral stiffness in the lateral direction of the vehicle is lower than a vertical stiffness in the vertical direction of the vehicle.

Toe control during braking is hereinafter described in detail.

In the presence of a braking force input to road wheel 1, resulting from braking torque application, axle housing 11 tends to be displaced in the rearward direction of the vehicle body. At this time, a longitudinal displacement of the rearward-displaced connection point (i.e., bush 21) of lower front link 12 to axle housing 11 and a longitudinal displacement of the rearward-displaced connection point (i.e., bush 23) of lower rear link 13 to axle housing 11 become almost the same. However, regarding lateral displacements of these connecting points toward the inboard side of the vehicle, owing to the previously-noted arrangement of straight lines L1 and L2, a lateral displacement of the connection point (i.e., bush 21) of lower front link 12 tends to become greater than a lateral displacement of the connection point (i.e., bush 23) of lower rear link 13. That is, the connection point (i.e., bush 21) of the lower front part of axle housing 11 tends to be pulled toward the inboard side of the vehicle. Therefore, during braking, a toe motion change of road wheel 1 in a toe-in direction occurs, thus enhancing handling and stability of the vehicle.

Details of coil spring 15 are hereinafter described.

Coil spring 15, whose axis XA is a substantially vertical direction of the vehicle, is interleaved between the vehicle body and lower rear link 13. In the plan view, the position of coil spring 15 is arranged to overlap with the straight line L2. It is preferable to place the coil axis XA on the straight line L2.

In the shown embodiment, coil spring 15 is mounted substantially at a midpoint of the connection point (i.e., bush 23) of the outboard side of the vehicle and the connection point (i.e., bush 24) of the inboard side of the vehicle. A bearing surface of the coil end of coil spring 15 is laid out to overlap the overhanging portion 16 in such a manner as to enlarge the contour of the rear end of lower rear link 13 depending on the outside diameter of coil spring 15.

The assembling structure of coil spring 15 is hereinafter described.

Figure 4:
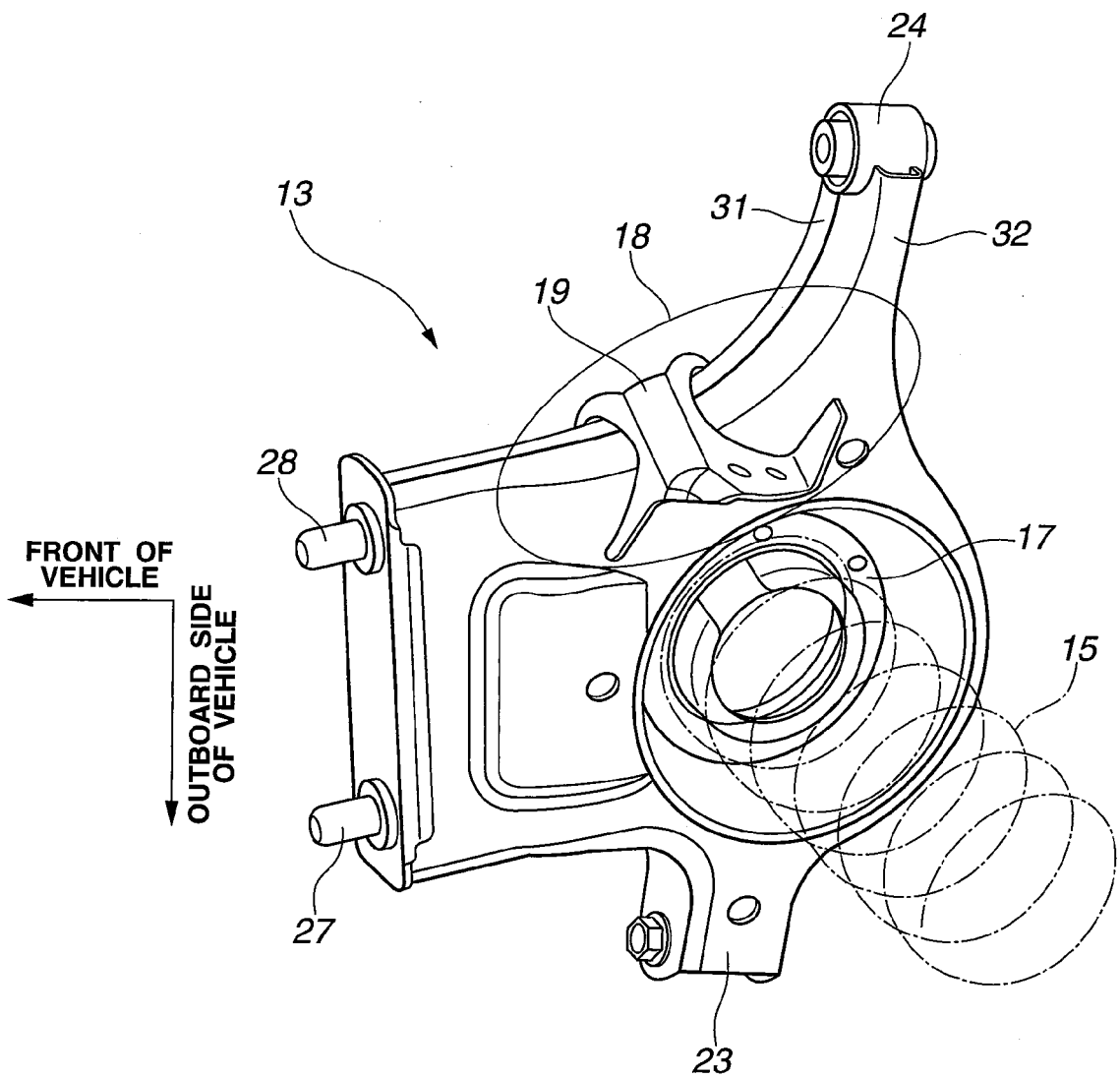
FIG. 4 is a view showing the outside of a lower rear link, hanging down during installation for the rear suspension of the embodiment on a suspension member.

Referring now to FIG. 4, there is shown the outside of lower rear link 13.

An annular lower spring seat 17 is interleaved between the lower end of coil spring 15 and lower rear link 13. That is, lower spring seat 17 is mounted on the lower rear link 13, and then the lower end of coil spring 15 is mounted on the lower spring seat 17.

Figure 5B:
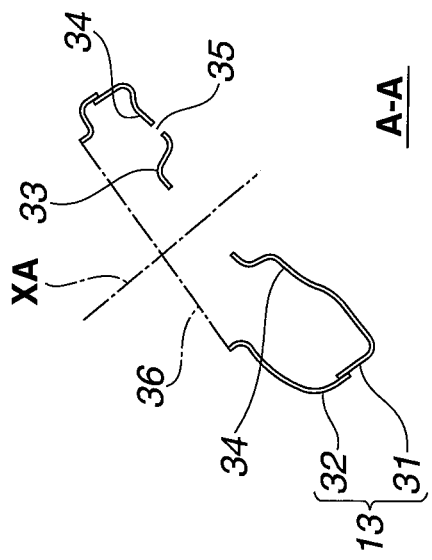
FIG. 5B is a cross-sectional view taken along the line A-A of FIG. 5A.
Figure 5A:
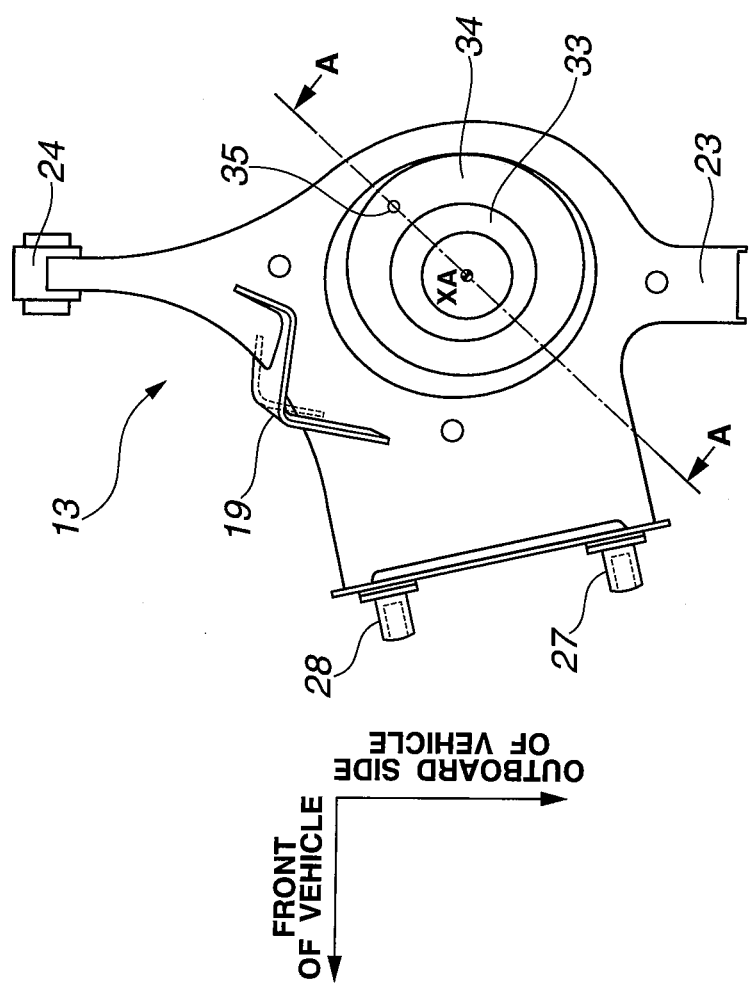

Referring now to FIGS. 5A-5B, there is shown the detailed structure of lower rear link 13. FIG. 5A is the top view of lower rear link 13, whereas FIG. 5B is the cross-sectional view taken along the line A-A of FIG. 5A.

Lower rear link 13 has a hollow structure comprised of thin-walled, recessed upper and lower halves (each formed into a substantially bean-jam wafer shape) fitted, mated, joined, or connected together in such a manner that their recessed portions oppose each other. In the shown embodiment, a lower bracket 31 corresponding to the lower half and an upper bracket 32 corresponding to the upper half are integrally connected to each other by welding.

Returning to FIG. 4, lower rear link 13 has a curved portion 18 whose cross section rapidly changes from the connection point (i.e., bush 24) of lower rear link 13 to suspension member 2 toward the inboard-side connection point (i.e., bush 28) of the front end of lower rear link 13 to the lower front link 12. A stiffening bracket 19 is connected to the curved portion 18 in a manner so as to hold both the lower bracket 31 and the upper bracket 32, while sandwiching them. Lower rear link 13 and stiffening bracket 19 are integrally connected to each other by electric-arc welding.

Lower spring seat 17 is mounted on the concave side (i.e., the bottom face of the inside) of lower bracket 31. Coil spring 15, whose lower end is mounted on the lower spring seat 17, is laid out to protrude upward through an opening formed in the upper bracket 32.

The concave side (i.e., the bottom face of the inside) of lower bracket 31, that is, the lower half of the lower rear link is formed with a substantially cylindrical raised portion 33 extending toward the upper bracket 32, that is, the upper half of the lower rear link (see FIG. 5B). Raised portion 33 is formed as a substantially cylindrical shape whose geometrical center substantially corresponds to the coil axis XA of coil spring 15. The outside diameter of the raised portion is dimensioned to be less than the inside diameter of coil spring 15.

Lower bracket 31 has an engagement hole 35 having a circular cross section and formed in a mounting face 34 for lower spring seat 17 as a through opening penetrating the lower bracket 31. The mounting face 34 is formed as an annular area adjacent to and radially outside of the raised portion 33 and configured to be substantially conformable to the shape of lower spring seat 17. Engagement hole 35 is formed substantially at a midpoint of the mounting face 34 in the radial direction.

Upper bracket 32 has a circular opening 36 whose geometrical center substantially corresponds to the coil axis XA. The inside diameter of the circular opening is dimensioned to be greater than the outside diameter of coil spring 15.

Figure 6C:
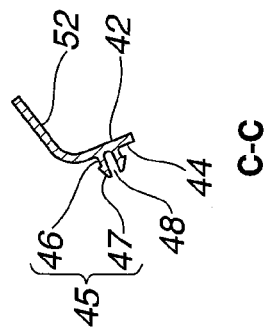
FIG. 6C is a cross section taken along the line C-C of FIG. 6A.
Figure 6D:
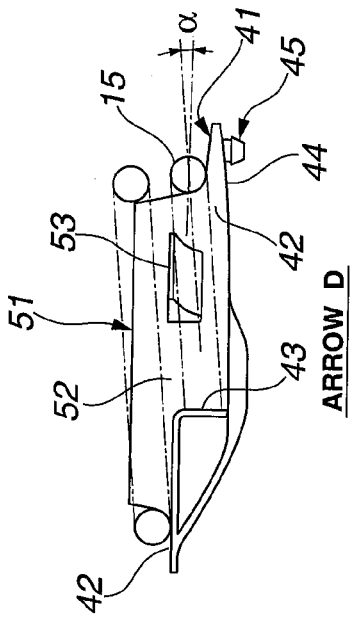
FIG. 6D is a view in the direction of the arrow D in FIG. 6A.
Figure 6A:
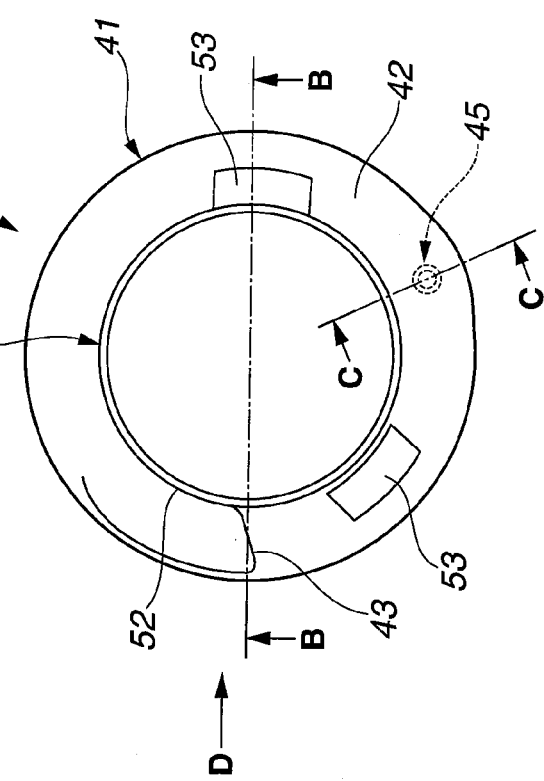
FIG. 6A is a view showing the detailed structure of a lower spring seat.
Figure 6B:
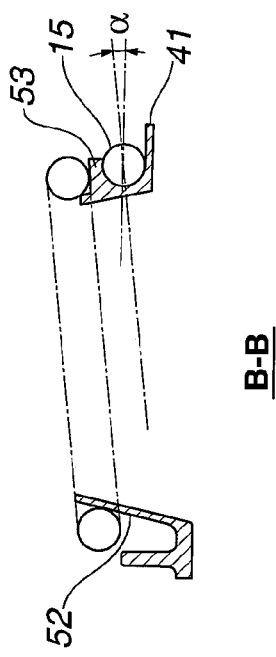
FIG. 6B is a cross section taken along the line B-B of FIG. 6A.

Referring now to FIGS. 6A-6D, there is shown the detailed structure of lower spring seat 17. FIG. 6A is the top view of lower spring seat 17, FIG. 6B is the cross-sectional view taken along the line B-B of FIG. 6A, FIG. 6C is the cross-sectional view taken along the line C-C of FIG. 6A, and FIG. 6D is the view in the direction of the arrow D in FIG. 6A.

Lower spring seat 17 is formed of a synthetic resin material having weather resistance and heat resistance, for example polyethylene resin materials. Lower spring seat 17 is comprised of an annular seat body 41 and a cylindrical portion 51 located or formed on the upper face of seat body 41 in a manner so as to upwardly extend continuously from the inner periphery of seat body 41.

The inside diameter of the inner periphery of seat body 41 is dimensioned to be greater than the outside diameter of raised portion 33. The outside diameter of the outer periphery of seat body 41 is dimensioned to be greater than the outside diameter of coil spring 15. That is, seat body 41 is configured such that the seat body can be fitted onto the raised portion 33.

The upper face of seat body 41 is in abutted-engagement with the lower end of coil spring 15, and also constructed by a spirally sloped surface 42 configured to be substantially conformable to a pitch angle α of the first turn at the lower end of coil spring 15. An upstanding stepped surface 43 is formed between lowest and highest points located on both ends of sloped surface 42 in the spirally sloped direction, in a manner so as to extend in the radial direction of coil spring 15. The coil end of the wire at the lower end of coil spring 15 is formed as a non-grinding open end. That is, the pitch angle α of the first turn at the lower end of coil spring 15 and the pitch angle α of the second turn at the lower end of coil spring 15 are almost the same, and thus a clearance space is defined between the coil end of the first turn and the wire of the second turn, at the lower end of coil spring 15.

Therefore, the lower face of the first turn at the lower end of coil spring 15 is in sliding-contact with the sloped surface 42 around its entire circumference. Additionally, the coil end of the wire of coil spring 15 is in abutted-engagement with the stepped surface 43. In this manner, the lower spring seat is configured such that coil spring 15 can be seated on the seat body 41.

Seat body 41 is formed with a protrusion 45 substantially at a radial midpoint of its lower face 44, in such a manner as to be inserted into the engagement hole 35. Protrusion 45 is comprised of a root 46 whose outside diameter is less than the inside diameter of engagement hole 35, and a tapered nose 47 whose basal end has an outside diameter greater than the inside diameter of engagement hole 35 and whose tip has an outside diameter less than the inside diameter of engagement hole 35. The axial length of root 46 is dimensioned to be equal to the thickness of lower bracket 31.

Protrusion 45 has a slot 48 formed to extend from its nose 47 to its root 46. Slot 48 enables the two opposing divided faces to be displaced toward each other, thereby permitting an appropriate deflection. Under a state where the opposing divided faces at the nose 47 are displaced in close proximity to each other, the maximum outside diameter of the basal end of the tapered nose is dimensioned to be equal to the inside diameter of engagement hole 35.

Thus, the deflection of the opposing divided faces, moving toward each other, permits a forward movement of the nose 47 relative to engagement hole 35, passing through the engagement hole in the direction of insertion (i.e., in the forward direction). After having passed through the engagement hole, the return of the opposing divided faces, moving apart from each other, prevents a backward movement of the nose 47 relative to engagement hole 35, thus preventing the nose from falling out of the engagement hole in the removal direction (i.e., in the backward direction).

The inside diameter of cylindrical portion 51 is dimensioned to be slightly greater than the outside diameter of raised portion 33. The outside diameter of cylindrical portion 51 is dimensioned to be slightly less than the inside diameter of coil spring 15. The height of cylindrical portion 51 is dimensioned to be equal to that of the raised portion 33. That is, cylindrical portion 51 is configured such that the cylindrical portion can be fitted onto the raised portion 33 and that the cylindrical portion can be fitted into the coil spring 15.

Cylindrical portion 51 has at least one radially-protruding flange 53 formed on its outer peripheral surface 52. In the shown embodiment, two flanges 53, 53 are formed on the outer periphery of the cylindrical portion at respective circumferential positions in a manner so as to be formed or laid out along the pitch angle α of the first turn at the lower end of coil spring 15. A clearance of each flange 53, spaced apart from the sloped surface 42, and a radially-protruding length of each flange 53, radially protruding from the outer peripheral surface 52, are determined depending on the wire diameter of coil spring 15.

Hence, when inserting the coil end of the wire of coil spring 15 between the sloped surface 42 and each flange 53, the upper face of the first turn at the lower end of coil spring 15 is brought into sliding-contact with the lower face of each flange 53. That is, each flange 53, radially protruding through the clearance space defined between the adjacent wires of the first turn and the second turn of coil spring 15, is configured to hold the wire of the first turn at the lower end of coil spring 15, while being kept in abutted-engagement with the upper face of the first turn.

The lower face of the root of flange 53 is formed into an inverse-round shape configured to be substantially conformable to the wire diameter of coil spring 15. That is, the cross section (the thickness) of flange 53 is configured to increase toward the root. Thus, the lower face of flange 53 is configured to be kept in wall-contact with the wire of the first turn at the lower end of coil spring 15.

The layout of protrusion 45 is hereinafter described in detail.

Referring now to FIGS. 7A-7B, there are shown the ideal layout of protrusions formed on the respective lower spring seats of rear suspensions for rear-left and rear-right road wheels and the actual layout of the protrusion, common to the respective lower spring seats of rear-left and rear-right suspensions. FIG. 7A is the top view of lower rear link 13, whereas FIG. 7B is the top view of lower spring seat 17.

Due to a rotation axis XB of inclination of the coil spring inclined due to its dead load during assembling, the plane perpendicular to the coil axis XA of coil spring 15 is inclined with respect to the concave side (i.e., the bottom face of the inside) of lower bracket 31 of lower rear link 13.

In order to minimize a moment arm about the rotation axis XB, it is preferable to form the protrusion 45 at the higher point of the sloped seat body 41 located on a perpendicular line (simply, a perpendicular) normal to the rotation axis XB. As discussed above, an ideal position P1 for the protrusion of the rear-left wheel side and an ideal position P2 for the protrusion of the rear-right wheel side can be determined. These ideal positions P1-P2 are symmetrical with respect to the symmetry axis of rear-left and rear-right road wheels. Therefore, for the purpose of providing the lower spring seat 17 of the same shape common to rear-left and rear-right road wheels, actually, protrusion 45 is formed substantially at a circumferential midpoint of the lower face 44 of the sloped seat body 41 between the ideal positions P1-P2.

The layout of flange 53 is hereinafter described in detail.

Referring now to FIGS. 8A-8B, there are shown the ideal layout of flanges formed on the respective lower spring seats of rear suspensions for rear-left and rear-right road wheels and the actual layout of the flanges, common to the respective lower spring seats of rear-left and rear-right suspensions. FIG. 8A is the top view of lower rear link 13, whereas FIG. 8B is the top view of lower spring seat 17.

A straight line passing through the inboard-side connection point (i.e., bush 22) of lower front link 12 to suspension member 2 and the inboard-side connection point (i.e., bush 24) of lower rear link 13 to suspension member 2 is an axis XC of oscillation motion of lower front link 12 and lower rear link 13.

When assembling lower front link 12 and lower rear link 13, under a condition where only the inboard-side connection points (i.e., bushes 22 and 24) have been connected to the suspension member, the outboard side of lower front link 12 and lower rear link 13, pivotably supported by the oscillation-motion axis XC, tends to hang down. That is, the lower link tends to stroke in the rebound direction.

Under this condition, of two points of the outer periphery of cylindrical portion 51 of lower spring seat 17, located on a straight line passing through the coil axis XA and perpendicular to the oscillation-motion axis XC, it is preferable to form the flange 53 on an inboard-side point of the two points closer to the oscillation-motion axis XC. As discussed above, an ideal position P3 for the flange of the rear-left road wheel and an ideal position P4 for the flange of the rear-right road wheel can be determined. These ideal positions P3-P4 are symmetrical with respect to the symmetry axis of rear-left and rear-right road wheels. Therefore, for the purpose of providing the lower spring seat 17 of the same shape common to rear-left and rear-right road wheels, actually, two flanges 53, 53 are formed on the outer peripheral surface 52 of cylindrical portion 51 at the respective circumferential ideal positions P3-P4.

[Operation]

The assembling process of coil spring 15 is hereinafter described in detail.

First of all, assembly of lower spring seat 17 on the lower rear link 13 is made. Concretely, seat body 41 and cylindrical portion 51 are fitted onto the raised portion 33 of lower bracket 31, while protrusion 45 is inserted into the engagement hole 35 of lower bracket 31. At this time, the nose 47 of protrusion 45 is temporarily caught in the engagement hole 35. However, a deflection of the slotted protrusion 45 with the slot 48, arising from a further push in the direction of insertion, permits the nose 47 to pass through the engagement hole 35. After having passed through the engagement hole, the nose 47 of protrusion 45 is allowed to snap back to its initial position (unstressed position), thus preventing the nose 47 from falling out of the engagement hole in the removal direction.

In this manner, protrusion 45 can be reliably held and fitted in the engagement hole 35 by snap-back action, and whereby it is possible to suppress a circumferential displacement of lower spring seat 17 relative to lower rear link 13. Additionally, by means of the previously-noted falling-out prevention structure, it is possible to prevent lower spring seat 17 from being undesirably disassembled from the lower rear link 13.

Thereafter, assembly of coil spring 15 on lower spring seat 17 is made. Concretely, the lower end of coil spring 15 can be fitted and screwed onto the cylindrical portion 51 of lower spring seat 17 by rotating the coil spring 15 in its winding direction, while inserting the coil end of the wire of coil spring 15 between the upper face (i.e., the spirally sloped surface 42) of seat body 41 of lower spring seat 17 and the flange 53 of cylindrical portion 51 of lower spring seat 17.

The sloped surface 42 of seat body 41 is configured to be substantially conformable to the pitch angle $\alpha$ of the first turn at the lower end of coil spring 15. Hence, the lower face of the first turn at the lower end of coil spring 15 is in sliding-contact with the sloped surface 42 around its entire circumference. Therefore, when coil spring 15 is rotated during assembly, it is possible to effectively suppress a displacement of the coil axis XA of coil spring 15, thereby ensuring the ease of fitting (assembly) of coil spring 15 onto cylindrical portion 51.

An upstanding stepped surface 43 is formed between lowest and highest points located on both ends of sloped surface 42 in the spirally sloped direction, in a manner so as to extend in the radial direction of coil spring 15, and therefore the coil end of the wire of coil spring 15 is in abutted-engagement with the stepped surface 43. This contributes to accurate but easy positioning of coil spring in the rotation direction, when fitting coil spring 15 onto cylindrical portion 51.

Flange 53 is configured to be substantially conformable to the sloped surface 42. Additionally, a clearance of flange 53, spaced apart from the sloped surface 42, and a radially-protruding length of flange 53, radially protruding from the outer peripheral surface 52, are determined depending on the wire diameter of coil spring 15. Hence, flange 53 serves to hold the wire of the first turn at the lower end of coil spring 15, while being kept in abutted-engagement with the upper face of the first turn. Therefore, even in a condition where lower spring seat 17 is somewhat inclined with respect to a horizontal plane, it is possible to suppress a displacement (an inclination) of the coil axis XA of coil spring 15, while reliably holding the coil spring.

That is, as described previously, under a condition where only the inboard-side connection points (i.e., bush 22 of lower front link 12 and bush 24 of lower rear link 13) have been connected to the suspension member in the middle of assembling process, the outboard side of lower front link 12 and lower rear link 13 tends to hang down. However, self-standing of coil spring 15 can be assisted by means of flange 53, thus effectively suppressing coil spring 15 from undesirably overturning or falling out of the lower spring seat 17. That is, coil spring 15 can be easily held and therefore it is possible to enhance the ease of assembly of coil spring 15.

For instance, assuming that coil spring 15 begins to turn over from its lower spring seat 17, a gouging-out or scooping-out input is applied from the wire of the first turn at the lower end of coil spring 15 to the lower face of flange 53. However, the lower face of the root of flange 53 is formed into an inverse-round shape configured to be substantially conformable to the wire diameter of coil spring 15, and thus the lower face of flange 53 is kept in wall-contact with the wire of the first turn at the lower end of coil spring 15. Hence, even in the presence of such a gouging-out or scooping-out input to the lower face of flange 53, it is possible to disperse stresses applied to the flange 53, thus enhancing the durability of flange 53.

Lower spring seat 17 is formed of a synthetic resin material, and hence the lower spring seat is superior in weather resistance and heat resistance. Also, as compared to an elastic body formed of a rubber or a synthetic rubber, such a synthetic-resin spring seat (lower spring seat 17) has a lower friction coefficient. Hence, when fitting lower spring seat 17 onto the raised portion 33 of lower bracket 31, and when fitting coil spring 15 onto the cylindrical portion 51 of lower spring seat 17, a less sliding resistance, resulting from the low friction coefficient, contributes to the ease of assembly.

Fully taking account of both the ideal layout of protrusion 45 of seat body 41 and the ideal layout of flange 53 of cylindrical portion 51, the shapes of lower spring seats 17, 17 of rear suspensions for rear-left and rear-right road wheels are configured to be identical to each other. That is, regarding the actual protrusion layout, protrusion 45 is formed substantially at a circumferential midpoint of the lower face 44 of seat body 41 between the ideal positions P1-P2. Thus, it is possible to provide the lower spring seat 17 of the same shape, common to rear-left and rear-right road wheels, while suppressing an increase in moment arm about the rotation axis XB. Additionally, regarding the actual flange layout, two flanges 53, 53 are formed on the outer peripheral surface 52 of cylindrical portion 51 at the respective circumferential ideal positions P3-P4. Thus, it is possible to provide the lower spring seat 17 of the same shape, common to rear-left and rear-right road wheels, while effectively supporting the coil spring 15. Therefore, it is possible to ensuring reduced component parts, while enhancing the ease of assembly of coil spring 15.

In the suspension assembling structure of the embodiment (in particular, see FIGS. 8A-8B), two flanges 53, 53 are discontinuously formed to be spaced apart from each other at the respective circumferential positions P3-P4 without continuously forming the flange around the entire circumference of cylindrical portion 51. By the well-balanced layout of the flanges circumferentially spaced apart from each other, it is possible to support or hold the coil spring 15 in a good balance. Furthermore, even in the presence of application of a gouging-out or scooping-out input from the wire of the first turn at the lower end of coil spring 15 to the lower face of flange 53, the circumferential spacing between two flanges 53, 53 serves as a relief clearance that allows such a gouging-out or scooping-out input. That is, by means of these two flanges 53, 53, circumferentially spaced apart from each other, it is possible to absorb the gouging-out or scooping-out input. Thus, as compared to the use of a flange continuously formed around the entire circumference of cylindrical portion 51, the layout of two flanges 53, 53, circumferentially spaced apart from each other, is superior in enhanced durability.

Additionally, at least one of two flanges 53, 53 is laid out on a straight line passing through the coil axis XA and perpendicular to the oscillation-motion axis XC of lower front link 12 and lower rear link 13. Therefore, during assembly of the suspension, it is possible to more effectively suppress coil spring 15 from undesirably overturning or falling out of the lower spring seat 17. That is, this flange layout enables coil spring 15 to be held more reliably and more easily, thus more certainly enhancing the ease of assembly of coil spring 15.

By the way, the shape, layout and number of component parts, constructing the suspension assembling structure, are not limited to the particular embodiments described previously. As appreciated, various changes and modifications may be made without departing from the scope or spirit of this invention.

In the shown embodiment, lower spring seat 17 is mounted on the concave side of lower bracket 31. In lieu thereof, on the assumption that there is an adequate vertical clearance space between the vehicle body and the upper bracket 32, lower spring seat 17 may be mounted on the upper face of upper bracket 32.

Also, in the shown embodiment, the coil end of the wire at the lower end of coil spring 15 (coil spring means) is formed as a non-grinding "open end", rather than a "closed end", often called "tapered end". The coil end may be formed as a grinding "tapered end". In lieu thereof, a "tangent-tail end" or a "pig-tail end" may be used as a coil end.

Hereupon, lower rear link 13 corresponds to a "suspension link" (suspension link means), whereas lower spring seat 17 corresponds to a "spring seat" (spring seat means).

[Effects]

(1) According to the suspension assembling structure of the embodiment, lower bracket 31, constructing part of lower rear link 13, has the engagement hole 35 formed in the mounting face 34 for the lower spring seat 17. The seat body 41 of lower spring seat 17 has the protrusion 45 located or formed on the lower face 44 and configured to be brought into engagement with the lower rear link 13 by insertion and snap-fit into the engagement hole 35. Additionally, the cylindrical portion 51 of lower spring seat 17 has at least one flange 53 formed on the outer peripheral surface 52, and radially protruding through the clearance space defined between the adjacent wires of coil spring 15, and configured to hold the wire of the first turn at the lower end of coil spring 15, while being kept in abutted-engagement with the upper face of the first turn.

In this manner, lower spring seat 17 can be brought into engagement with the lower rear link 13 via the protrusion 45. Additionally, coil spring 15 is held by means of the flange 53 by abutted-engagement of the flange with the upper face of the wire of the first turn at the lower end. This contributes to the ease of holding the coil spring 15. That is, it is possible to enhance the ease of assembly of coil spring 15.

(2) According to the suspension assembling structure of the embodiment, flange 53 is configured to be substantially conformable to the pitch angle α of the first turn at the lower end of coil spring 15.

Hence, when assembling, the upper face of the first turn at the lower end of coil spring 15 can be brought into sliding-contact with the lower face of flange 53. Thus, it is possible to enhance the performance to hold or support the coil spring 15.

(3) According to the suspension assembling structure of the embodiment, flange 53 has its root whose lower face is formed into an inverse-round shape configured to be substantially conformable to the wire diameter of coil spring 15.

Hence, the lower face of flange 53 can be brought into wall-contact with the wire of the first turn at the lower end of coil spring 15. Therefore, even in the presence of a gouging-out or scooping-out input to the lower face of flange 53, it is possible to disperse stresses applied to the flange 53, thus enhancing the durability of flange 53.

(4) According to the suspension assembling structure of the embodiment, lower spring seat 17 is formed of a synthetic resin material.

Hence, it is possible to provide the lower spring seat 17 having superior weather resistance and heat resistance. Also, as compared to an elastic body formed of a rubber or a synthetic rubber, the synthetic-resin spring seat (lower spring seat 17) has a lower friction coefficient, thus resulting a less sliding resistance, consequently ensuring the ease of assembly.

(5) According to the suspension assembling structure of the embodiment, the sloped surface 42 of seat body 41 is configured to be substantially conformable to the pitch angle α of the first turn at the lower end of coil spring 15. Additionally, the upstanding stepped surface 43 is formed between lowest and highest points located on both ends of sloped surface 42 in the spirally sloped direction in a manner so as to extend in the radial direction of coil spring 15.

Hence, the coil end of the wire of coil spring 15 is kept in abutted-engagement with the stepped surface 43. This enables accurate but easy positioning of coil spring 15 in the rotation direction, when fitting coil spring 15 onto cylindrical portion 51.

(6) According to the suspension assembling structure of the embodiment, protrusion 45 is configured to have a flexibility and also configured to have a nose 47, which nose has an outside diameter greater than an inside diameter of engagement hole 35.

Hence, when protrusion 45 is inserted into the engagement hole 35, the nose of protrusion 45 is temporarily caught in the engagement hole 35, and thereafter the nose of protrusion 45 is permitted to pass through the engagement hole 35 by a further push. As a result, the nose 47 of protrusion 45 is allowed to snap back to its initial position (unstressed position), thus preventing the nose 47 from falling out of the engagement hole in the removal direction. In this manner, by reliably holding and fitting the protrusion 45 in the engagement hole 35 by snap-back action, it is possible to suppress a circumferential displacement of lower spring seat 17 relative to lower rear link 13. In particular, when mounting coil spring 15 on lower spring set 17, it is possible to suppress a circumferential displacement of lower spring seat 17. Also, by means of the falling-out prevention structure, it is possible to prevent lower spring seat 17 from being undesirably disassembled from the lower rear link 13.

(7) According to the suspension assembling structure of the embodiment, two flanges 53, 53 are formed on the outer peripheral surface 52 of cylindrical portion 51 at respective circumferential positions P3-P4.

Hence, by the well-balanced layout of the flanges circumferentially spaced apart from each other, it is possible to support or hold the coil spring 15 in a good balance. Furthermore, even in the presence of application of a gouging-out or scooping-out input from the wire of the first turn at the lower end of coil spring 15 to the lower face of flange 53, the circumferential spacing between two flanges 53, 53 serves as a relief clearance that allows such a gouging-out or scooping-out input. Thus, as compared to the use of a flange continuously formed around the entire circumference of cylindrical portion 51, the layout of two flanges 53, 53, circumferentially spaced apart from each other, is superior in enhanced durability.

(8) According to the suspension assembling structure of the embodiment, at least one of the two flanges 53, 53 is laid out on a straight line passing through the coil axis XA and perpendicular to the oscillation-motion axis XC of the suspension link (lower rear link 13) on the vehicle-body side (the inboard side of the vehicle).

Hence, during assembly of the suspension, it is possible to more effectively suppress coil spring 15 from undesirably overturning or falling out of the lower spring seat 17. That is, this flange layout enables coil spring 15 to be held more reliably and more easily, thus more certainly enhancing the ease of assembly of coil spring 15.

(9) According to the spring seat of the embodiment, protrusion 45 is located or formed on the lower face 44 of seat body 41 and configured to be brought into engagement with the lower rear link 13. Additionally, the outer peripheral surface 52 of cylindrical portion 51 is formed with the flange 53, radially protruding through the clearance space defined between the adjacent wires of coil spring 15, and configured to hold the wire of the first turn at the lower end of coil spring 15, while being kept in abutted-engagement with the upper face of the first turn.

As discussed above, seat body 41 is brought into engagement with the lower rear link 13 via the protrusion 45. Additionally, the wire of the first turn at the lower end of coil spring 15 is kept in abutted-engagement with the upper face of the first turn. This contributes to the ease of holding the coil spring 15. That is, it is possible to enhance the ease of assembly of coil spring 15.

(10) According to the suspension assembling method of the embodiment, lower spring seat 17 is brought into engagement with the lower rear link 13 by insertion and snap-fit of the protrusion 45 into the engagement hole 35, and then the lower end of coil spring 15 is fitted onto the cylindrical portion 51 by rotating the coil spring 15 while inserting the coil end of the wire of coil spring 15 between the seat body 41 and the flange 53.

As discussed above, lower spring seat 17 is brought into engagement with the lower rear link 13 via the protrusion 45. Additionally, the wire of the first turn at the lower end of coil spring 15 is kept in abutted-engagement with the upper face of the first turn. This contributes to the ease of holding the coil spring 15.

That is, it is possible to enhance the ease of assembly of coil spring 15.

[Modification]

Figure 9:
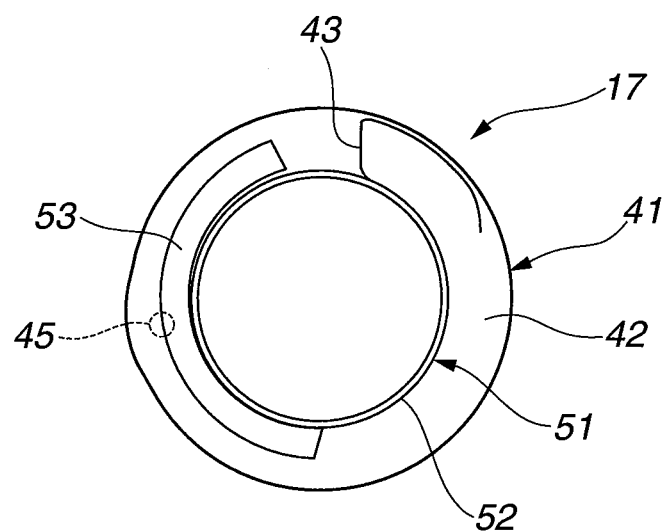
FIG. 9 is a top view illustrating a modification of the flange.

In the shown embodiment, two flanges 53, 53 are formed on the outer peripheral surface 52 of cylindrical portion 51 at respective circumferential positions. In lieu thereof, a single flange may be partially formed on the outer peripheral surface 52 of cylindrical portion 51 in a manner so as to continuously interconnect two flanges 53, 53 at a minimum circumferential distance (see the modified flange shown in FIG. 9). In the same manner as the discontinuously-formed two flanges 53, 53 of the spring seat of the embodiment (see FIG. 6A), the partially, continuously-formed flange of the modification (see FIG. 9) contributes to the ease of holding the coil spring 15, thus enhancing the ease of assembly of coil spring 15.

The entire contents of Japanese Patent Application No. 2011-109665 (filed May 16, 2011) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A suspension assembling structure comprising:
a suspension link through which a road wheel and a vehicle body are pivotably connected to each other;
a coil spring interleaved between the suspension link and the vehicle body in such a manner that a coil axis of the coil spring is arranged in a substantially vertical direction of the vehicle body;
a spring seat interleaved between the suspension link and a lower end of the coil spring;
the suspension link having an engagement hole formed in a mounting face for the spring seat;
the spring seat comprising:
(a) a seat body;
(b) a protrusion formed on a lower face of the seat body and configured to be brought into engagement with the suspension link by insertion into the engagement hole;
(c) a cylindrical portion located on an upper face of the seat body and configured to be fitted into the lower end of the coil spring; and
(d) at least one flange formed on an outer peripheral surface of the cylindrical portion in a manner so as to radially protrude through a clearance space defined between adjacent wires of the coil spring, and configured to hold the wire of a first turn at the lower end of the coil spring, while being kept in abutted-engagement with an upper face of the first turn,
wherein said at least one flange comprises two flanges formed on the outer peripheral surface of the cylindrical portion at respective circumferential positions, and
wherein at least one of the two flanges is laid out on a straight line that passes through the coil axis and is perpendicular to an axis of oscillation motion of the suspension link on a side of the vehicle body.

2. The suspension assembling structure as claimed in claim 1, wherein:
the flange is configured to be substantially conformable to a pitch angle of the first turn at the lower end of the coil spring.

3. The suspension assembling structure as claimed in claim 1, wherein:
the flange has a root whose lower face is formed into an inverse-round shape configured to be substantially conformable to a wire diameter of the coil spring.

4. The suspension assembling structure as claimed in claim 1, wherein:
the spring seat is formed of a synthetic resin material.

5. The suspension assembling structure as claimed in claim 1, wherein:
the seat body has a sloped surface configured to be in abutted-engagement with the lower end of the coil spring, and further configured to be substantially conformable to a pitch angle of the first turn at the lower end of the coil spring, and an upstanding stepped surface formed between lowest and highest points located on both ends of the sloped surface in a spirally sloped direction in a manner so as to extend in a radial direction of the coil spring, and kept in abutted-engagement with a coil end of the wire of the coil spring.

6. The suspension assembling structure as claimed in claim 1, wherein:
the protrusion is configured to have a flexibility and further configured to have a nose, which nose has an outside diameter greater than an inside diameter of the engagement hole.

7. A spring seat comprising:
a seat body configured to be interleaved between a suspension link and a lower end of a coil spring;
a protrusion located on a lower face of the seat body and configured to be brought into engagement with the suspension link;
a cylindrical portion located on an upper face of the seat body and configured to be fitted into the lower end of the coil spring; and
at least one flange formed on an outer peripheral surface of the cylindrical portion in a manner so as to radially protrude through a clearance space defined between adjacent wires of the coil spring, and configured to hold the wire of a first turn at the lower end of the coil spring, while being kept in abutted-engagement with an upper face of the first turn,
wherein said at least one flange comprises two flanges formed on the outer, peripheral surface of the cylindrical portion at respective circumferential positions and
wherein at least one of the two flanges is laid out on a straight line passing through a coil axis and perpendicular to an axis of oscillation motion of the suspension link on a side of a vehicle body.

8. In the suspension assembling structure as claimed in claim 1, a suspension assembling method comprising in combination:
bringing the spring seat into engagement with the suspension link by insertion of the protrusion into the engagement hole; and
fitting the lower end of the coil spring onto the cylindrical portion by rotating the coil spring while inserting the coil end of the wire of the coil spring between the seat body and the flange.

9. A suspension assembling structure comprising:
a suspension link means through which a road wheel and a vehicle body are pivotably connected to each other;
a coil spring means interleaved between the suspension link means and the vehicle body in such a manner that a coil axis of the coil spring means is arranged in a substantially vertical direction of the vehicle body;
a spring seat means interleaved between the suspension link means and a lower end of the coil spring means;
the suspension link means having an engagement hole formed in a mounting face for the spring seat means;
the spring seat means comprising:
(a) a seat body;
(b) a protrusion formed on a lower face of the seat body and configured to be brought into engagement with the suspension link means by insertion into the engagement hole;
(c) a cylindrical portion located on an upper face of the seat body and configured to be fitted into the lower end of the coil spring means; and
(d) at least one flange formed on an outer peripheral surface of the cylindrical portion in a manner so as to radially protrude through a clearance space defined between adjacent wires of the coil spring means, and configured to hold the wire of a first turn at the lower end of the coil spring means, while being kept in abutted-engagement with an upper face of the first turn, wherein said at least one flange comprises two flanges formed on the outer peripheral surface of the cylindrical portion at respective circumferential positions and wherein at least one of the two flanges is laid out on a straight line passing through the coil axis and perpendicular to an axis of oscillation motion of the suspension link means on a side of the vehicle body.

\* \* \* \* \*